(12) United States Patent
Provost et al.

(10) Patent No.: US 8,675,039 B2
(45) Date of Patent: Mar. 18, 2014

(54) METHOD OF TRANSFERRING COMMUNICATION STREAMS

(75) Inventors: Herve Provost, Seyssinet-Pariset (FR); Marc Berenguer, Revel (FR); Laurent Viroulaud, Grenoble (FR)

(73) Assignee: France Telecom, Paris (FR)

( * ) Notice: Subject to any disclaimer, the term of this patent is extended or adjusted under 35 U.S.C. 154(b) by 1522 days.

(21) Appl. No.: 12/097,551

(22) PCT Filed: Dec. 14, 2006

(86) PCT No.: PCT/FR2006/051363
§ 371 (c)(1), (2), (4) Date: Jun. 16, 2008

(87) PCT Pub. No.: WO2007/071873
PCT Pub. Date: Jun. 28, 2007

(65) Prior Publication Data
US 2008/0267385 A1   Oct. 30, 2008

(30) Foreign Application Priority Data

Dec. 16, 2005  (FR) .................................... 05 53922

(51) Int. Cl.
*H04M 3/42* (2006.01)
*H04L 12/16* (2006.01)
*H04Q 11/00* (2006.01)
*H04N 7/14* (2006.01)

(52) U.S. Cl.
USPC ............... 348/14.08; 348/14.01; 379/201.01; 379/202.01; 379/212.01; 370/260; 455/416

(58) Field of Classification Search
USPC ............... 379/202.01, 212.01, 90.01, 93.01, 379/93.21, 157, 158, 201.01, 207.01; 370/259, 260, 261, 262; 455/414.1, 455/416; 348/14.01, 14.02, 14.03, 14.04, 348/14.05, 14.06, 14.08, 14.09, 14.1, 14.11, 348/14.12, 14.13, 14.14, 15.15, 14.16
See application file for complete search history.

(56) References Cited

U.S. PATENT DOCUMENTS

2003/0185375 A1* 10/2003 Albal ....................... 379/220.01
2004/0030749 A1*  2/2004 Bowman-Amuah ......... 709/204
(Continued)

FOREIGN PATENT DOCUMENTS

WO       WO 03/046747 A1       6/2003

OTHER PUBLICATIONS

Helen J. Wang, et al., "A Signaling System Using Lightweight Call Sessions", Nineteenth Annual Joint Conference of the IEEE Computer and Communications Societies, vol. 2, XP010376159, Mar. 26, 2000, pp. 697-706.

(Continued)

*Primary Examiner* — Khai N Nguyen
(74) *Attorney, Agent, or Firm* — David D. Brush; Westman, Champlin & Koehler, P.A.

(57) ABSTRACT

A method of transferring communication streams, including establishing a first stream via a first communication path between a first terminal and a second terminal, opening a second communication path between the second terminal and the first terminal, sending to the first terminal, via the second communication path, a request to establish a communication stream between the first terminal and a third terminal via a third communication path, and comparing respective capabilities of the first terminal and the third terminal to determine whether it is possible to establish a communication stream between the first terminal and the third terminal, and in the affirmative, interrupting the first stream and establishing a communication stream, between the first terminal and the third terminal.

11 Claims, 1 Drawing Sheet

(56) References Cited

U.S. PATENT DOCUMENTS

2006/0140175 A1* 6/2006 Han .............................. 370/352
2007/0086583 A1* 4/2007 Jabri et al. ............... 379/202.01

OTHER PUBLICATIONS

Ken Ohta, et al., "Adaptive Terminal Middleware for Session Mobility", Multimedia Signal Processing, XP010642403, May 19, 2003, pp. 394-399.

R. Sparks, et al., "Session Initiation Protocol Call Control-Transfer draft-ietf-sipping-cc-transfer-01", Sipping WG Internet Draft, XP 002250289, Feb. 11, 2003, pp. 1-32.

"Corporate Telecommunication Networks (CN); Signalling interworking between QSIG and SIP; Call Transfer", European Telecommunications Standards Institute, vol. ECMATC32, No. V111, TS 102 392, XP014027355, Feb. 2005, pp. 1-29.

* cited by examiner

METHOD OF TRANSFERRING COMMUNICATION STREAMS

The invention relates to a method of transferring communication streams.

The transferring of communication streams, more commonly called call transfer, consists in substituting a second communication stream, established between a third terminal and a first terminal, to a first communication stream, established between the first terminal and a second terminal.

In the field of telecommunications, it is known to use specialized switches, of PABX (Private Automatic Branch Exchange) type to operate such a transfer. However, this equipment can only transfer communications in the environment confined to the local network which is situated downstream of this equipment. Furthermore, this equipment does not make it possible to perform the transfer of a videophone communication to a simple telephony communication, or vice-versa.

The aim of the invention is to provide a generic solution for communication stream transfer, applicable in respect of a transfer to any telecommunication terminal able to establish at least one communication stream and to any telecommunication network.

With this aim, the subject-matter of the invention is, according to a first aspect, a method comprising the following steps:

establishing a first stream via a first communication path between a first terminal and a second terminal, opening a second communication path between the second terminal and the first terminal, sending to the first terminal, via the second communication path, a request to establish a communication stream between the first terminal and a third terminal via a third communication path, comparing the respective capabilities of the first and the third terminal so as to determine whether it is possible to establish a communication stream between the first terminal and the third terminal, and in the affirmative, interrupting the first stream and establishing a communication stream, termed the second stream, between the first terminal and the third terminal.

The establishment of an additional communication path (second path), serving as auxiliary path, allows the sending of data specifying the transfer request and the establishment of the second communication stream in response to and in accordance with this request. This method of transferring communication streams is applicable to any type of transfer, whatever the type of terminal present, whatever the type of communication stream established, whatever the telecommunication networks, whether the first and second telecommunication networks are distinct or identical, in particular due to allowance for the respective capabilities of the first and third terminals.

According to an embodiment, the second communication path is independent of the first communication path and of the first communication stream. In this way, the procedure for establishing the second communication path does not disturb the communication established between the first and the second terminal via the first communication path. This communication can therefore continue up to the establishment of the second communication stream, or indeed even subsequent to this establishment if the terminal supports two simultaneous streams.

In the invention, the first communication stream can be of several types: telephonic stream, videophone stream, data stream, or multimedia stream, and the second communication stream can advantageously be of a different type from that of the first communication stream. The method according to the invention is therefore applicable to a transfer of a telephonic stream to a videophone stream or vice-versa.

Preferably at least part of the data intended to be conveyed via the second stream and at least part of the data intended to be conveyed via the first stream are of one and the same type, in particular of the audio type or of the video type.

According to an embodiment, the method according to the invention comprises a step of determining communication parameters, in particular audio and/or video coding standard, with a view to implementing said communication stream between the first terminal and the third terminal. The nature of the communication stream is dependent in particular on the respective capabilities of the first and third terminals, these capabilities determining the possible communication parameters in respect of the communication stream to be established. From among the possible communication parameters will preferably be selected the parameters making it possible to establish a communication of the same nature (audio and/or video and/or data) as that of the first stream, and, optionally, of the same level of quality.

According to an embodiment, the method according to the invention comprises a step of sending, to the first terminal, through the second communication path, authentication data to be used during the establishment of said communication stream between the first terminal and the third terminal. The step of establishing the communication stream is in this case completely transparent for a user of the first terminal and can be performed without the intervention of this user.

According to an embodiment, the method according to the invention comprises a step consisting in sending to the first terminal, via the second communication path, connection parameters necessary for establishing the second stream. These are for example parameters regarding connection to a server via which the second stream must be established. The first terminal is therefore able to establish the second communication stream with any third terminal on the basis of these parameters.

In a particular embodiment, the communication network used to establish the first communication path and the first stream is different from the communication network used to establish the third communication path and the second stream. The invention is therefore suited to any type of transfer, including transfers from a network of STN type to an IP network or vice versa.

Preferably the first or second networks are interconnected together in such a way that the parameters regarding connection to the third terminal can be obtained on the basis of any one of the terminals accessing the first network.

In an embodiment, the second communication path is established by way of a relay of communication between the first terminal and the second terminal. Such a communication relay is advantageously accessible and shared by several terminals of the first communication network, and thus usable by these terminals for managing and implementing call transfers at the request of these terminals.

Preferably, the aforesaid communication relay accesses the first and the second network at one and the same time in such a way that it is able to communicate with any one of the first, second and third terminals to implement call transfer or in such a way that it can take charge of obtaining the parameters regarding connection to the third terminal following the receipt of a transfer request from the second terminal.

In a particular embodiment, the step of interrupting the first stream is posterior to the step of establishing the second. The method therefore makes it possible to guarantee continuity of communication, the first stream being able to coexist temporarily with the second stream.

The subject-matter of the invention is also a terminal, termed the first terminal, comprising
- means for establishing with a second terminal a first stream via a first communication path,
- means for opening a second communication path with a second terminal,
- means for receiving from the second terminal via the second communication path a request to establish a communication stream between the first terminal and a third terminal via a third communication path,
- a module able to compare the respective capabilities of the first and the third terminal so as to determine whether the establishment of a communication stream between the first terminal and the third terminal is possible.

Correlatively, the subject-matter of the invention is also a terminal, termed the first terminal, comprising,
- means for establishing with a second terminal a first stream via a first communication path,
- means for opening a second communication path with the second terminal,
- means for sending, to the second terminal, via the second communication path, a request to establish a communication stream between the first terminal and a third terminal via a third communication path,
- a module able to compare the respective capabilities of the first and the third terminal so as to determine whether the establishment of a communication stream between the first terminal and the third terminal is possible.

The subject-matter of the invention is also a module, intended to be integrated for example within a communication relay or within a terminal, able to cooperate with a first terminal and a second terminal having established between them a first communication stream, said module comprising,
- means for opening a first communication path with the first terminal,
- means for opening a second communication path with the second terminal,
- means for receiving from the second terminal via the second communication path a request to establish a communication stream between the first terminal and a third terminal via a third communication path,
- means for transferring said request to the first terminal via the first communication path,
- said module being able to compare the respective capabilities of the first and the third terminal so as to determine whether the establishment of a communication stream between the first terminal and the third terminal is possible.

Other aims, characteristics and advantages of the invention will be apparent through the description which follows, given solely by way of nonlimiting example, and with reference to the appended drawings in which.

Here, terminal is understood to mean any type of hardware apparatus or of software and hardware assembly making it possible to establish a communication stream with another remote terminal, for example a conventional STN telephone, a cellular telephone, software executing on a micro-computer connected to at least one telecommunication network, hardware for videoconferencing over IP network, etc.

Here, capabilities of a terminal is understood to mean the whole set of parameters determining the capacities of the terminal in relation to the establishment of communication sessions. These parameters define in particular:
- the communication establishment protocols supported (H320, H323, SIP, GSM, STN, etc.),
- the audio and/or video stream encoding and/or decoding algorithms supported,
- the telecommunication media offered by the terminal: audio only, video only (real time, streaming, etc.), audio and video, etc.,
- the processing characteristics of the streams: minimum latency time required by the network, bit rates supported, packet loss tolerated, connection speed, etc.,
- the networks to which it can be connected (STN, GSM, packet transmission network, etc.),
- the connection parameters useful for reaching the terminal (access rights, IP ports to be opened on the dynamic firewalls, telephone number, IP address, etc.).

Within the context of the invention, two categories of communication stream are considered: useful streams and service streams. A useful stream is a stream serving for telecommunication proper; it may for example be a telephonic stream, a videophone stream, a data stream or more generally a multimedia stream; the useful stream can therefore transport various types of data: sound, image, or other data. A service stream is, within the context of the invention, a stream used to perform and manage the transfer of the useful stream.

A service stream and a useful stream can be transported by one and the same network (for example via an IP network, using the packet mode data transport service of a UMTS (Universal Mobile Telecommunication System) third-generation telephone network), or by different types of networks (for example an IP over ADSL and STN network).

Figure 1:
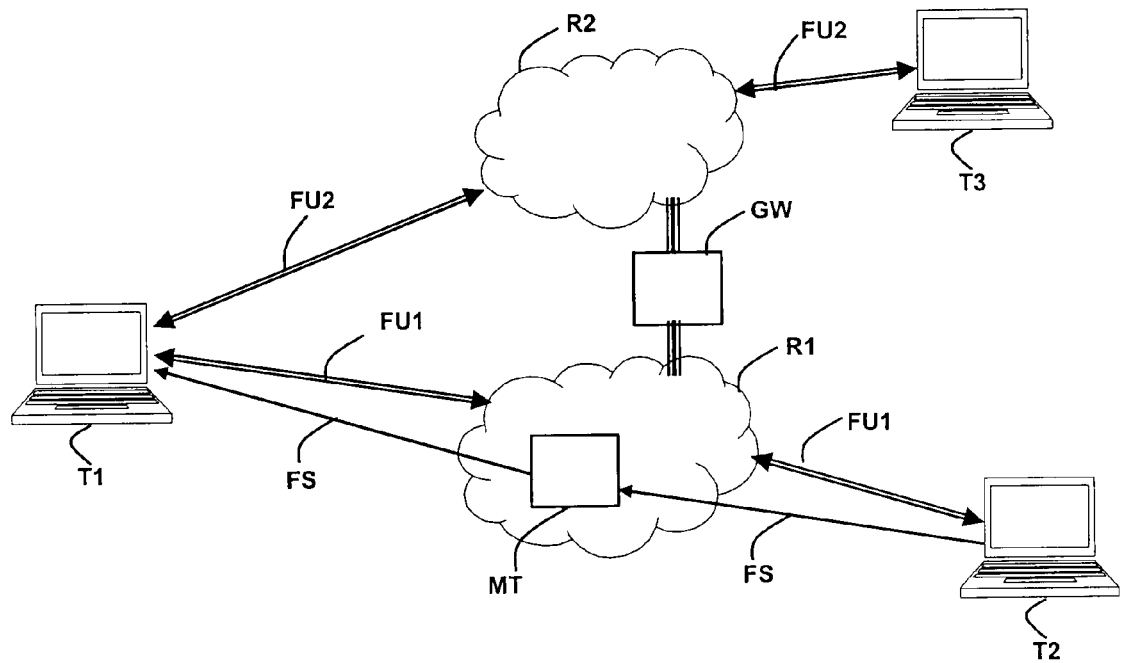
FIG. 1 represents in a diagrammatic manner a system allowing the implementation of the invention.

FIG. 1 represents a system allowing the implementation of the invention. This system comprises three terminals T1, T2 and T3 and two communication networks R1 and R2. It furthermore comprises a transfer module MT integrated within a communication relay of the network R1, as well as a gateway GW between the networks R1 and R2.

A first useful stream FU1 is established between a first terminal T1 and a second terminal T2 via a first communication path and via a first communication network R1. The transfer method is aimed at establishing a second useful stream FU2 between the terminal T1 and a third terminal T3, this second stream being intended to take over from the first useful stream FU1.

The second stream takes over from the first stream for all or part of the data conveyed via the useful stream FU1: for example only for data of sound type (in this case it may be said that there is transfer solely of a telephone stream, or of the telephony part of the videophone stream), or else for data of sound and image type (in this case it may be said that there is transfer of a videophone stream in its entirety).

The transfer module MT is a software module which manages useful communication stream transfer. This transfer module is either integrated within one of the terminals T1 or T2, or integrated within a communication relay that is physically independent of the two terminals T1 and T2 and accessible via the network R1.

In an advantageous manner, such a transfer can be performed without the intervention of the user of the first terminal, in particular in accordance with the transfer request transmitted via the second communication path and by means of data transmitted via this communication path.

Figure 2:
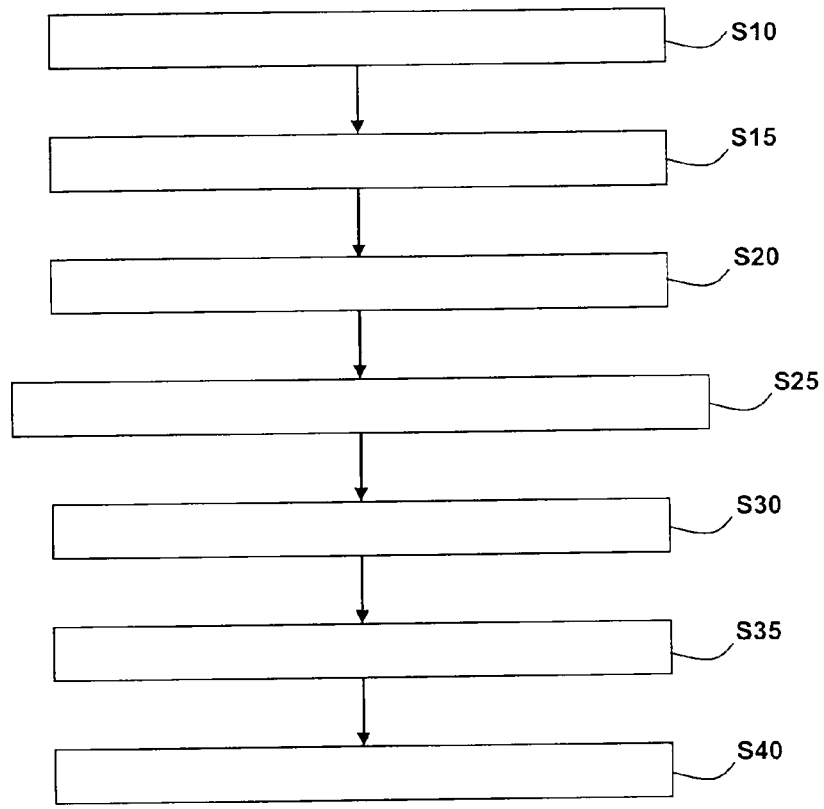
FIG. 2 is a flowchart of an embodiment of the method according to the invention.

Steps S10 to S40 of the method according to the invention are described now by reference to FIG. 2.

The terminal T1 establishes S10 a communication session and a useful stream FU1 with the terminal T2 via the network R1 and via a first communication path. This assumes that the terminals T1 and T2 have a certain number of capabilities C1-2 in common. The useful stream FU1 is for example a videophone stream transporting sound and image data.

The user of the terminal T2 decides to transfer the useful stream FU1 to the terminal T3; when commanded by this user, the terminal T2 attempts to establish S15 with the transfer module MT a communication session for the transmission of a stream of transfer data, termed the service stream FS2 or auxiliary stream.

The transfer module MT is configured to accept any communication session establishment request originating from the terminal T2, possibly through prior steps of authentication, checking of tariff rates, priority rule application, etc. Subsequent to these prior steps, the communication session is established between the transfer module MT and the terminal T2 for transmission of the service stream FS2.

In step S20, the terminal T2 sends to the transfer module MT via the service stream FS2 a request for transfer to the terminal T3.

The transfer module MT records the transfer request and then verifies S25 that the terminals T1 and T3 have in common a certain number of the capabilities (C1-3) enabling the establishment of a communication stream between these two terminals.

The aim of this step of comparing capabilities is not only to ensure that the respective capabilities of the terminals T1 and T3 in terms of protocols supported, coders, etc., allow the establishment of a communication session between the terminal T1 and T3, but also, as a consequence, to determine, as a function of the common capabilities of the terminals T1 and T3, the communication parameters, in particular the audio and/or video coding standard, that are usable or to be used for the implementation of this session.

In the negative the transfer module MT signals to the terminal T2 the impossibility of performing the requested transfer; in the converse case, the transfer module MT attempts to establish a communication session for the transmission of a service stream FS1 with the terminal T1.

The terminal T1 is configured so as, in the case where the terminal T1 is available to respond to this request, to accept such a communication session establishment request originating from the transfer module MT and establish the communication session with the transfer module MT for transmission of the service stream FS1.

As an alternative, the establishment of the session between the terminal T1 and the transfer module MT is performed conditionally on explicit acceptance of the user of the terminal (via a dialog window for example) and/or conditionally on the success of an authentication procedure intended to verify that the terminal T1 and/or the terminal T2 and/or the transfer module possesses sufficient rights to establish such a session.

In the case where the terminal T1 is unavailable upon receipt of the transfer request, a signaling is envisaged to warn the transfer module and/or the terminal T1 and/or the terminal T2 of the failure of the attempt to establish the session.

The service stream FS1 and the service stream FS2 are thus established via a second, distinct, communication path independent of the first communication path used for the transmission of the first useful stream.

The transfer module MT sends in step S30 a command for transfer to the terminal T1 via the service stream FS1 intended to trigger the activation of the transfer from the terminal T1. This command comprises the connection parameters required by the terminal T1 to establish a communication stream FU2 with the terminal T3. These parameters comprise for example: the network to be used, the connection protocol to be used, the number to be dialed or the IP connection parameters (communication port, IP address).

According to an embodiment, these parameters comprise identification and/or authentication data when the latter are required for establishing the useful stream FU2 between the terminal T1 and the terminal T3, for example when this stream is established via an access server. In this way, the user of the terminal does not have to input such data and the communication stream transfer can be performed in a manner transparent to this user, in particular without the intervention of this user.

According to a first alternative, only a part of these parameters is sent to the terminal T1 and the user is invited to input the missing information and/or complementary information such as authentication data.

According to a second alternative, only a part of these parameters is sent to the terminal T1 and the user is invited to present a chip card to a card reader of the terminal T1 for reading the missing information and/or complementary information such as authentication data, for example a password.

As an option, for each of the three alternatives, the parameters sent are confidential in relation to the user of the terminal T1, for example not visible to this user or encrypted. In this way, the user of the terminal T1 will not be able by himself to establish a connection with the terminal T3 but solely when requested by the user of the terminal T2. This results in possible regulating of the calls to the terminal T3.

The terminal T1 breaks S35 the useful stream with the terminal T2, if this stream has not already been interrupted by the terminal T2, then attempts to establish a communication session for the transmission of a useful stream FU2 with the terminal T3 via the network R2 and via a third communication path, according to the parameters provided by transfer module MT.

If the terminal T3 accepts the communication establishment request, a second useful stream FU2 is then established between the terminals T1 and T3. Depending on the capabilities common to the terminals T1 and T3, this second useful stream makes it possible to convey either data of sound type, or data of image type, or other data, or else a combination of these types of basic data. Specifically, the nature of the second useful stream will depend on the result of comparing the capabilities of the terminals T1 and T3. For example, if the common capabilities of terminals T1 and T3 are solely video (respectively audio) stream establishment capabilities, only a video (respectively audio) stream may be established. Depending on case, it is therefore a part or the whole of the useful stream FU1 which will be replaced with the useful stream FU2.

In the case where the transfer module is integrated within the terminal T1 a single service stream is necessary: the stream FS2 between the terminal T2 and the transfer module MT of the terminal T1. In such a situation, the transfer module MT is designed to be able to communicate with a software module for managing the communication sessions of the terminal T1.

In a symmetric manner, in the case where the transfer module is integrated within the terminal T2 a single service stream is necessary: the stream FS1 between the terminal T1 and the transfer module MT of the terminal T2. In such a situation, the transfer module MT is designed to be able to communicate with a software module for managing the communication sessions of the terminal T2.

By generalizing these various embodiments, a service stream FS is established via a second communication path between the terminal T1 and the terminal T2, this second communication path allowing the exchange of data between the terminal T1 and the terminal T2.

The service stream FS corresponds:
- either to the two service streams FS2 and FS1, in the case where the transfer module MT is physically independent of the terminals T1 and T2 and constitutes a communication relay between the terminals T1 and T2 for establishing the service stream FS;
- or to the service stream FS2, in the case the transfer module MT is integrated within the terminal T1;
- or to the service stream FS1, in the case the transfer module MT is integrated within the terminal T2.

The three streams FU1, FU2 and FS, as well as the paths associated with these streams, are independent of one another in that they can each be transported by a different network or a network of different type with respect to the other streams. Additionally, they are not synchronized with respect to one another.

In the case where the networks R1 and R2 are different, it is assumed that the terminal T1 has available the hardware and software resources necessary for accessing the network R1 and the network R2 at one and the same time.

If the resources available to the terminal T1 do not allow it to simultaneously maintain two communication sessions (a session for the useful stream FU1 and a session for the useful stream FU2), it will have to interrupt the useful stream FU1 before establishing the useful stream FU2. In the converse case, for example in the case where the terminal T1 is personal computer capable of simultaneously maintaining two voice streams in VoIP (Voice over IP) mode, the terminal T1 can wait for the complete establishment of the useful stream FU2 before breaking the useful stream FU1. The step of establishing the useful stream FU2 can therefore be posterior or prior to the step of interrupting the useful stream FU1.

The evaluation regarding the compatibility between the terminals T1 and T3 (evaluation of the capabilities C1-3) is preferably performed by the transfer module MT, so as to avoid instigating a transfer procedure that is doomed to failure. This assumes that the transfer module MT determines beforehand the capabilities of the terminal T3 and compares them with those of the terminal T1.

The capabilities of the terminal T3 can either be determined by interrogating the terminal T3, for example, via an SNMP ("Simple Network Management Protocol") software agent residing in the terminal T3, or be obtained by consulting a database storing beforehand the capabilities of the terminals to which such transfers are apt to be performed.

As an alternative, the transfer module MT does not perform such an evaluation, and the terminal T1 attempts to establish a connection with the parameters available to it and apprises the transfer module MT of the success or failure of the establishment of the communication. In this case, the transfer module MT retransmits this information to the terminal T2.

In a particular embodiment, the transfer module MT is configured to dialog with the terminal T1 and the terminal T2 via the service stream FS1, FS2 or FS, so as to follow the progress of the transfer and inform the user of the terminal T2 thereof.

The method according to the invention applies to various scenarios of use.

According to an exemplary scenario, a patient is in communication with a hospital center (or call center) and the hospital center decides to transfer this communication to a duty doctor. The patient is equipped with a terminal T1 in the form of a micro-computer accessing the STN network for establishing a telephone stream and furthermore having an ADSL modem for establishing a videophone stream with the hospital center. The hospital center is equipped with a terminal T2, also in the form of a micro-computer having the same configuration as the terminal T1. The duty doctor has for his part only a GSM telephone constituting the terminal T3.

When the patient establishes the communication to the hospital center, the terminal T1 establishes a telephonic stream via the STN network with the terminal T2 of the hospital center. A duty officer of the hospital center responds and makes a fast first analysis of the motivation for the patient's call. Thereafter, by means of his terminal T2, the duty officer establishes a video stream, allowing a videoconference linkup with the patient.

After an exchange with the patient, the duty officer decides to transfer the patient's call to a duty doctor. He clicks for example on an icon associated with the doctor's particulars to trigger the transfer. A transfer module, for example in the form of a server on the IP network, seen at one and the same time through the terminals T1 and T2, sends this doctor's telephone number to the terminal T1 via a service stream.

The terminal T1 interrupts the videoconference with the duty officer, then dials the duty doctor's telephone number. The duty doctor's telephone rings. He then responds to the patient without the latter having had to take any action. The communication stream between the duty doctor and the patient is in this case solely a telephone stream.

In a variant of this scenario, the terminal T3 is a third-generation mobile telephone making it possible to establish a videoconference with the patient. In this case, the videophone stream between the terminal T1 and the terminal T2 is fully transferable. Specifically, the terminal T1 can instigate a videophone session according to the H264M standard, using its ADSL modem. The communication stream between the duty doctor and the patient is in this case a videophone stream.

The method also makes it possible for the parameters regarding connection to the terminal T3 to be kept confidential in relation to the user. This prevents patients from calling the duty doctor in future on his mobile without going through the hospital center or the call center. A filtering of the calls made to the duty doctor is therefore carried out.

The method according to the invention is independent of the telecommunication networks involved and does not make it necessary to call upon specialized equipment. Furthermore, it accommodates the capabilities of the terminals to transfer as the case may be the telephony, videophone or data part of the useful communication stream.

The invention claimed is:

1. A method comprising:
   establishing a first communication stream via a first communication path between a first terminal and a second terminal;
   opening a second communication path between the second terminal and the first terminal;
   sending to the first terminal, via the second communication path, a request to establish a second communication stream between the first terminal and a third terminal via a third communication path;
   comparing respective capabilities of the first terminal and the third terminal so as to determine whether it is possible to establish the second communication stream between the first terminal and the third terminal, and in the affirmative, establishing the second communication stream between the first terminal and the third terminal; and
   determining in dependence on the respective capabilities communication parameters to be used for establishing the second communication stream.

2. The method as claimed in claim 1, further comprising interrupting the first stream.

3. The method as claimed in claim 1, wherein the communication parameters comprise an audio and/or video coding standard to be used for establishing the second communication stream.

4. The method as claimed in claim 1, further comprising sending, to the first terminal, through the second communication path, authentication data required for establishing the second communication stream.

5. The method as claimed claim 1, in which the second communication path is established independently of the first communication path.

6. The method as claimed claim 1, further comprising sending to the first terminal, via the second communication path, connection parameters necessary for establishing the second communication stream.

7. The method as claimed in claim 1, in which the second communication path is opened by a communication relay between the first terminal and the second terminal.

8. A module that can cooperate with a first terminal and a second terminal having established between them a first communication stream, the module comprising:
   means for opening a first communication path with the first terminal;
   means for opening a second communication path with the second terminal;
   means for receiving from the second terminal via the second communication path a request to establish a second communication stream between the first terminal and a third terminal via a third communication path; and
   means for transferring the request to the first terminal via the first communication path, the module configured to compare respective capabilities of the first terminal and the third terminal so as to determine whether establishment of the second communication stream between the first terminal and the third terminal is possible and determining in dependence on the respective capabilities communication parameters to be used for establishing the second communication stream.

9. A first terminal, comprising:
   means for establishing with a second terminal a first communication stream via a first communication path;
   means for opening a second communication path with the second terminal;
   means for receiving from the second terminal via the second communication path a request to establish a second communication stream between the first terminal and a third terminal via a third communication path; and
   a module that is configured to compare respective capabilities of the first terminal and the third terminal so as to determine whether establishment of the second communication stream between the first terminal and the third terminal is possible and determining in dependence on the respective capabilities communication parameters to be used for establishing the second communication stream.

10. The first terminal as claimed in claim 9, further comprising:
   means for interrupting the first communication stream; and
   means for establishing the second communication stream with the third terminal.

11. A first terminal, comprising:
   means for establishing with a second terminal a first communication stream via a first communication path;
   means for opening a second communication path with the second terminal;
   means for sending, to the second terminal, via the second communication path, a request to establish a second communication stream between the first terminal and a third terminal via a third communication path; and
   a module configured to compare respective capabilities of the first terminal and the third terminal so as to determine whether establishment of the second communication stream between the first terminal and the third terminal is possible and determining in dependence on the respective capabilities communication parameters to be used for establishing the second communication stream.

* * * * *

UNITED STATES PATENT AND TRADEMARK OFFICE
CERTIFICATE OF CORRECTION

| | | |
|---|---|---|
| PATENT NO. | : 8,675,039 B2 | Page 1 of 1 |
| APPLICATION NO. | : 12/097551 | |
| DATED | : March 18, 2014 | |
| INVENTOR(S) | : Provost et al. | |

It is certified that error appears in the above-identified patent and that said Letters Patent is hereby corrected as shown below:

In the claims:

Claim 5, column 9, line 11, insert the word --in-- after the word --claimed--.

Claim 6, column 9, line 14, insert the word --in-- after the word --claimed--.

Signed and Sealed this
Twenty-second Day of September, 2015

Michelle K. Lee
*Director of the United States Patent and Trademark Office*